(12) United States Patent
Walker et al.

(10) Patent No.: US 10,666,961 B2
(45) Date of Patent: May 26, 2020

(54) DETERMINING MEDIA DELIVERY EVENT LOCATIONS FOR MEDIA TRANSPORT

(71) Applicant: QUALCOMM Incorporated, San Diego, CA (US)

(72) Inventors: Gordon Kent Walker, Poway, CA (US); Thomas Stockhammer, Bergen (DE)

(73) Assignee: Qualcomm Incorporated, San Diego, CA (US)

( * ) Notice: Subject to any disclaimer, the term of this patent is extended or adjusted under 35 U.S.C. 154(b) by 588 days.

(21) Appl. No.: 15/399,381

(22) Filed: Jan. 5, 2017

(65) Prior Publication Data
US 2017/0201761 A1 Jul. 13, 2017

Related U.S. Application Data

(60) Provisional application No. 62/276,674, filed on Jan. 8, 2016.

(51) Int. Cl.
*H04N 19/46* (2014.01)
*H04N 19/107* (2014.01)
(Continued)

(52) U.S. Cl.
CPC ......... *H04N 19/46* (2014.11); *H04L 65/4076* (2013.01); *H04L 65/4084* (2013.01);
(Continued)

(58) Field of Classification Search
None
See application file for complete search history.

(56) References Cited

U.S. PATENT DOCUMENTS

| 9,591,361 | B2 | 3/2017 | Nagaraj et al. |
| 2008/0037956 | A1* | 2/2008 | Nallur ............. G11B 27/034 386/326 |

(Continued)

FOREIGN PATENT DOCUMENTS

| CA | 2655493 A1 | 1/2008 |
| CN | 102308547 A | 1/2012 |

(Continued)

OTHER PUBLICATIONS

Advanced Television Systems Committee: "ATSC Candidate Standard: Signaling, Delivery, Synchronization, and Error Protection {A/331} / Doc. S33-174r1", ATSC, Jan. 5, 2016. (Year: 2016).*

(Continued)

*Primary Examiner* — James M Anderson, II
(74) *Attorney, Agent, or Firm* — Shumaker & Sieffert, P.A.

(57) ABSTRACT

A method of transporting media data includes, by a file-based protocol sending unit of a source device, receiving a stream of data comprising Segments of media data from a segmenter of the source device that forms the Segments, each of the Segments comprising a respective individually retrievable file associated with a unique uniform resource locator (URL), determining locations of media delivery events (MDEs) in the stream of media data, wherein the MDEs include data for at least a portion of one of the Segments, determining one or more transmission time requirements for the MDEs representing times at which the MDEs are to be sent to a client device, and providing the MDEs and data representing the transmission time requirements to a physical layer sending unit of the source device according to available delivery slots for the physical layer sending unit.

36 Claims, 14 Drawing Sheets

(51) Int. Cl.
| | |
|---|---|
| H04N 19/159 | (2014.01) |
| H04N 19/172 | (2014.01) |
| H04L 29/06 | (2006.01) |
| H04N 21/262 | (2011.01) |
| H04N 21/643 | (2011.01) |
| H04N 21/845 | (2011.01) |
| H04N 21/43 | (2011.01) |
| H04N 21/2381 | (2011.01) |
| H04L 29/08 | (2006.01) |

(52) U.S. Cl.
CPC .......... *H04L 67/02* (2013.01); *H04N 19/107* (2014.11); *H04N 19/159* (2014.11); *H04N 19/172* (2014.11); *H04N 21/2381* (2013.01); *H04N 21/26208* (2013.01); *H04N 21/4307* (2013.01); *H04N 21/643* (2013.01); *H04N 21/8456* (2013.01)

(56) References Cited

U.S. PATENT DOCUMENTS

| | | | |
|---|---|---|---|
| 2009/0157850 | A1 | 6/2009 | Gagliardi et al. |
| 2012/0259994 | A1* | 10/2012 | Gillies ............... H04L 12/1881 709/231 |
| 2014/0375894 | A1* | 12/2014 | Kellerman ......... H04N 21/4347 348/731 |
| 2016/0127756 | A1 | 5/2016 | Oh et al. |

FOREIGN PATENT DOCUMENTS

| | | |
|---|---|---|
| CN | 104253999 A | 12/2014 |
| CN | 105052107 A | 11/2015 |
| CN | 105100015 A | 11/2015 |
| CO | 6890076 A2 | 3/2014 |
| EP | 3148196 A1 | 3/2017 |
| RU | 2598992 C2 | 10/2016 |
| WO | 2013032582 A1 | 3/2013 |
| WO | WO-2013036451 A1 | 3/2013 |
| WO | 2014171718 A1 | 10/2014 |
| WO | 2015178690 A1 | 11/2015 |
| WO | 2016129973 A1 | 8/2016 |

OTHER PUBLICATIONS

Response to Written Opinion filed in International Application No. PCT/US2017/012551 dated Nov. 2, 2017, 4 pp.

Written Opinion of International Application No. PCT/US2017/012551 dated Feb. 21, 2018, 9 pp.

International Preliminary Report on Patentability issued in International Application No. PCT/US2017/012551 dated May 9, 2018, 11 pp.

Advanced Television Systems Committee: "ATSC Candidate Standard: Signaling, Delivery, Synchronization, and Error Protection (A/331) / Doc. S33-174r1", ATSC, Jan. 5, 2016 (Jan. 5, 2016), XP055332043, 131 pages. Retrieved from the Internet: URL:http:ffatsc. orgjwp-content/uploads/2016/02/S33-174r1-Signaling-Delivery-Sync-FEC.pdf.

DVB Organization: "ATSC Candidate Standard: Scheduler/Studio Transmitter Link," A324S32-266r16-Scheduler-SFN-STL.pdf, DVB, Digital Video Broadcasting, C/O EBU—17A Ancienne Route—CH-1218 Grand Saconnex, Geneva-Switzerland, Sep. 30, 2016, XP017851309, 66 pages.

International Search Report and Written Opinion—PCT/US2017/012551—ISA/EPO—dated Mar. 21, 2017—15 pp.

GK Walker et al., "Route/DASH IP Streaming-Based System for Delivery of Broadcast, Broadband, and Hybrid Services", IEEE Transactions on Broadcasting, IEEE, Service Center, Piscataway, NJ, US, vol. 62, No. 1, Mar. 1, 2016, XP011608972, pp. 328-337.

Lo, "S33-1: Delivery Protocol, Service Signaling, and Input Formatting", ATSC Bootcamp Presentation, Jan. 1, 2015, XP055340196, pp. 1-20. Retrieved from the Internet: URL:http://atsc.org/pdf/bootcamp/S33-1ATSC_Bootcamp_Presentation-2015_Delvery_Sync.pdf.

"ATSC Candidate Standard: Signaling, Delivery, Synchronization, and Error Protection (A/331)," Advanced Television Systems Committee, ATSC S33-174r5, Sep. 21, 2016, 180 Pages.

'Information technology—High efficiency coding and media delivery in heterogeneous environments—Part 1: MPEG media transport (MMT),' ISO/IEC JTC 1/SC 29 N; ISO/IEC CD 23008-1 2nd edition, Jul. 20, 2012, 69 pp.

"Information Technology—Dynamic Adaptive Streaming Over HTTP (DASH) Part 1: Media Presentation Description and Segment Formats," International Standard ISO/IEC 23009-1, Second edition, May 15, 2014, 152 pp.

"Information Technology—Coding of Audio-Visual Objects Part 12: ISO Base Media File Format," International Standard ISO/IEC 14496-12:2012, Fourth Edition, Jul. 15, 2012 Corrected version Sep. 15, 2012, 196 pp.

Advanced Television Systems Committee, "ATSC Working Draft: S32-Scheduler / Studio to Transmitter Link," Doc. S32-266r3, Dec. 4, 2015, 50 pp.

Fielding et al., "Hypertext Transfer Protocol—HTTP/1.1," Network Working Group, RFC 2616, Obsoletes: 2068, Jun. 1999, 160 pp.

Palia et al., "FLUTE—File Delivery over Unidirectional Transport," Internet Engineering Task Force (IETF), RFC 6726, Obsoletes: 3926, Nov. 2012, 55 pp.

International Standard, "Information technology—Coding of audio-visual objects—Part 3: Audio," ISO/IEC 14496-3, Second Edition, Dec. 15, 2001, 110 pp.

Itu-T H.265, "Series H: Audiovisual and Multimedia Systems, Infrastructure of audiovisual services—Coding of moving video, High efficiency video coding," The International Telecommunication Union. Dec. 2016, 664 pp.

\* cited by examiner

Audio

| Audio Frame N Audio Samples | Audio Frame N Audio Samples | Audio Frame N Audio Samples | Audio Frame N Audio Samples | Audio Frame N Audio Samples | Audio Frame N Audio Samples |
|---|---|---|---|---|---|
| An ISO BMFF Sample | An ISO BMFF Sample | An ISO BMFF Sample | An ISO BMFF Sample | An ISO BMFF Sample | An ISO BMFF Sample |
| An Atomic MDE | An Atomic MDE | An Atomic MDE | An Atomic MDE | An Atomic MDE | An Atomic MDE |
| An Aggregated MDE ||| An Aggregated MD |||

Video

| N=1 Video Frame | J Video Frames | I Video Frames | M Video Frames | K Video Frames | L Video Frames |
|---|---|---|---|---|---|
| An ISO BMFF Sample | Mutiple ISO BMFF Samples | Mutiple ISO BMFF Samples | Mutiple ISO BMFF Samples | Mutiple ISO BMFF Samples | Mutiple ISO BMFF Samples |
| An MDE | An MDE | An MDE | An MDE | An MDE | An MDE |
| An Aggregated MDE ||| An Aggregated MDE |||

FIG. 6

DETERMINING MEDIA DELIVERY EVENT LOCATIONS FOR MEDIA TRANSPORT

This application claims the benefit of U.S. Provisional Application No. 62/276,674, filed Jan. 8, 2016, the entire content of which is hereby incorporated by reference.

TECHNICAL FIELD

This disclosure relates to transport of media data.

BACKGROUND

Digital audio and video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like.

Media data, such as audio and video data, may be compressed for transport. Compression generally includes encoding of the media data. After media data has been encoded, the video data may be packetized for transmission or storage. The media data may be assembled into a media file conforming to any of a variety of standards, such as the International Organization for Standardization Base Media File Format and (ISO BMFF) extensions thereof, such as AVC.

Various techniques may be used to transport media data via a computer network. For example, media data may be delivered via a broadcast protocol or a unicast protocol. In a broadcast protocol, a server device sends media data to a plurality of subscribing client devices. In a unicast protocol, a client device requests media data from a server device, and the server device delivers the media data in response to the request.

SUMMARY

In general, this disclosure describes techniques related to support of Media Delivery Events (MDEs) used in, e.g., media aware byte range delivery via ROUTE (ATSC Working Draft: Signaling, Delivery, Synchronization, and Error Protection, Nov. 20, 2015) and MMT (ISO/IEC: ISO/IEC 23008-1 2nd edition, Information technology—High efficiency coding and media delivery in heterogeneous environments—Part 1: MPEG media transport (MMT)) or FLUTE (RFC 6726, which is a proper subset of ROUTE. These delivery techniques may further use broadcast Dynamic Adaptive Streaming over HTTP (DASH). Common Media Application Forma (CMAF), or similar Segment or media aware byte range based media delivery methods. This disclosure also describes techniques to determine time labeling of detected MDEs and adaptive techniques for delivery at the physical layer that take account of the impact of early media delivery relative to media aligned physical layer framing.

In one example, a method of transporting media data includes, by a file-based protocol sending unit of a source device, receiving a stream of data comprising Segments of media data from a segmenter of the source device that forms the Segments, each of the Segments comprising a respective individually retrievable file associated with a unique uniform resource locator (URL) or uniform resource identifier (URI), determining locations of media delivery events (MDEs) in the stream of media data, wherein the MDEs include data for at least a portion of one of the Segments, determining one or more transmission time requirements for the MDEs representing times at which the MDEs are to be sent to a client device, and providing the MDEs and data representing the transmission time requirements to a physical layer sending unit of the source device according to available delivery slots for the physical layer sending unit.

In another example, a device for transporting media data includes a segmenter configured to form a stream of data comprising Segments of media data, each of the Segments comprising a respective individually retrievable file for example ISO BMFF format associated with a unique uniform resource locator (URL) or uniform resource identifier (URI). The device also includes a physical layer sending unit configured to deliver media delivery events (MDEs) to a client device according to transmission time requirements for the MDEs, wherein the MDEs include data for at least a portion of one of the Segments, wherein the physical layer sending unit is configured with available delivery slots for receiving data to be delivered. The device further includes a file-based protocol sending unit configured to receive the stream of data comprising the Segments of media data from the Segmenter, determine locations of the MDEs in the stream of media data, determine one or more of the transmission time requirements for the MDEs representing times at which the MDEs are to be sent to the client device, and provide the MDEs and data representing the transmission time requirements to the physical layer sending unit according to the available delivery slots for the physical layer sending unit.

In another example, a device for transporting media data includes a segmenter configured to form a stream of data comprising Segments of media data, each of the Segments comprising a respective individually retrievable file associated with a unique uniform resource locator (URL) or uniform resource identifier (URI). The device also includes a physical layer sending unit configured to deliver media delivery events (MDEs) to a client device according to transmission time requirements for the MDEs, wherein the MDEs include data for at least a portion of one of the Segments, wherein the physical layer sending unit is configured with available delivery slots for receiving data to be delivered. The device further includes means for receiving a stream of data comprising Segments of media data from the segmenter, means for determining locations of the MDEs in the stream of media data, means for determining one or more transmission time requirements for the MDEs representing times at which the MDEs are to be sent to the client device, and means for providing the MDEs and data representing the transmission time requirements to the physical layer sending unit according to available delivery slots for the physical layer sending unit.

In another example, a computer-readable storage medium has stored thereon instructions that, when executed, cause a file-based protocol sending unit of a source device to receive a stream of data comprising Segments of media data from a segmenter of the source device that forms the Segments, each of the Segments comprising a respective individually retrievable file associated with a unique uniform resource locator (URL) or uniform resource identifier (URI), determine locations of media delivery events (MDEs) in the stream of media data, wherein the MDEs include data for at least a portion of one of the Segments, determine one or more transmission time requirements for the MDEs representing times at which the MDEs are to be sent to a client device, and provide the MDEs and data representing the transmission time requirements to a physical layer sending unit of the source device according to available delivery slots for the physical layer sending unit.

The details of one or more examples are set forth in the accompanying drawings and the description below. Other features, objects, and advantages will be apparent from the description and drawings, and from the claims.

BRIEF DESCRIPTION OF DRAWINGS

FIG. 6 is a conceptual diagram illustrating an example high level composition of MDEs.

DETAILED DESCRIPTION

Figure 1:
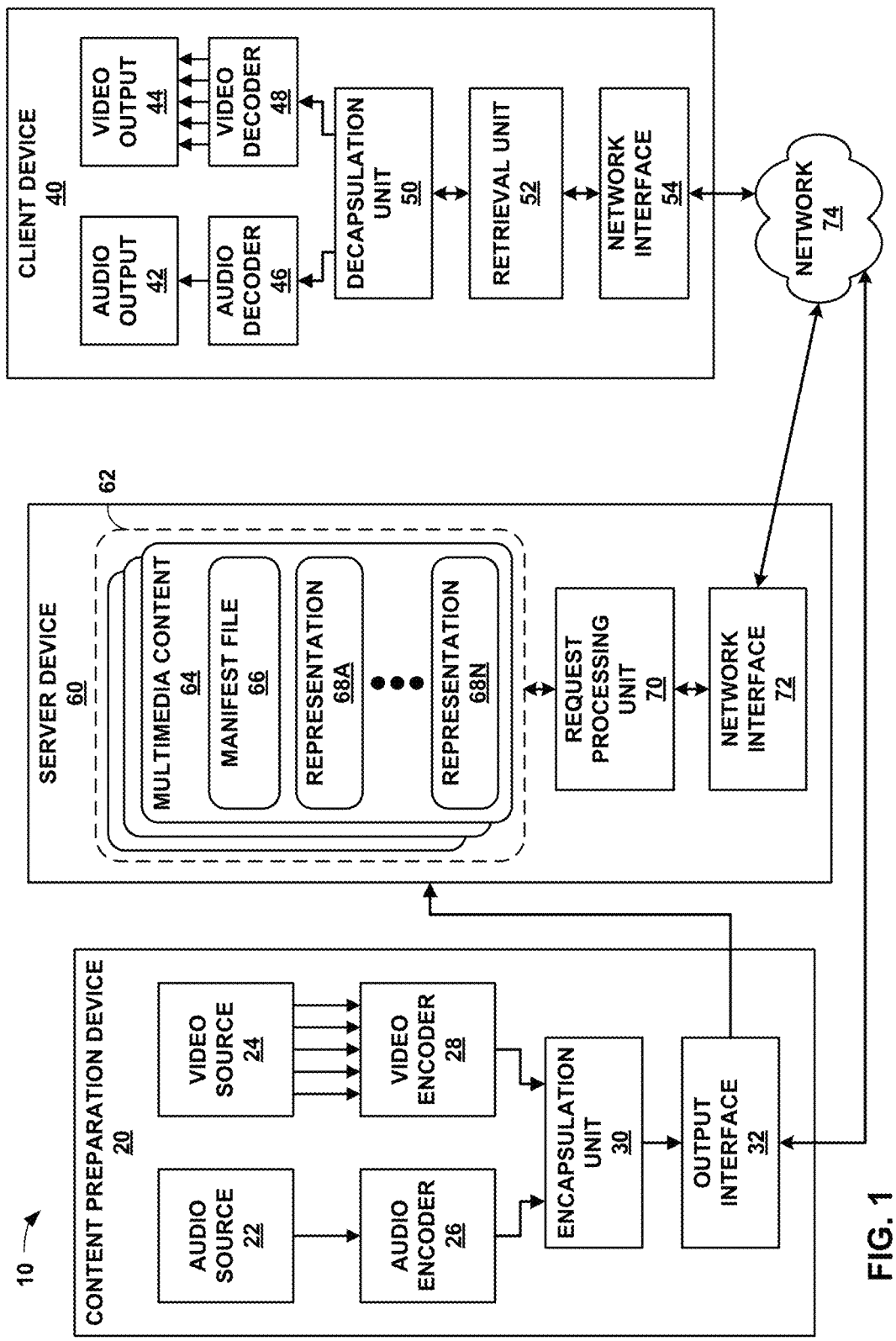
FIG. 1 is a block diagram illustrating an example system that implements techniques for streaming media data over a network.

In general, this disclosure describes techniques related to transporting media data. The techniques of this disclosure may be performed by a server device or other source device that streams media data to a client device. In particular, the source device may include a segmenter, a file-based protocol sending unit, and a physical layer sending unit. The segmenter may correspond to a unit that forms Segments of media data, where the Segments conform to, e.g., Dynamic Adaptive Streaming over HTTP (DASH) Segments. For example, the segmenter may encapsulate network abstraction layer (NAL) units into respective DASH Segments, where the Segments may each be associated with a distinct uniform resource locator (URL) or uniform resource identifier (URI). The file-based protocol sending unit may be configured to send data using a file-based protocol, such as File Delivery over Unidirectional Transport (FLUTE) or ROUTE. The physical layer sending unit may send media data at the physical layer, e.g., using Ethernet.

In accordance with the techniques of this disclosure, the segmenter may provide both Segments of media data, in the form of a stream of the Segments, to the file-based protocol sending unit. Thus, the file-based protocol sending unit may receive a stream of data including the Segments of media data from the segmenter. The file-based protocol sending unit may then determine locations of media delivery events (MDEs) in the stream of media data. In one example, the file-based protocol sending unit may form the MDEs from the stream of media data. For example, the file-based protocol sending unit may determine which portions of the stream are to be included in a particular MDE, such that the MDE includes data that is useful to a media decoder (e.g., data that can be properly decoded by the media decoder, assuming earlier data was delivered correctly).

To determine the locations of the MDEs, the file-based protocol sending unit may use pattern matching techniques, in which the file-based protocol sending unit is configured with one or more patterns for the media data included in the stream. Such patterns may represent, for example, an arrangement of media data in a hierarchical decoding order. For example, video data may be arranged according to a certain number of intra-predicted frames (I-frames), followed by a certain number of unidirectional inter-predicted frames (P-frames), followed by (or interspaced with) a certain number of bidirectional inter-predicted frames (B-frames). The file-based protocol sending unit may determine locations of MDEs based on the detection of the I-, P-, and B-frames and, for example, determine that an MDE includes a video sequence starting with a first I-frame and ending with a last B-frame before a subsequent I-frame, as one example. Furthermore, the file-based protocol sending unit may determine that a video MDE corresponds to a particular byte range of a Segment, where the byte range ends at a frame boundary. As another example, the file-based protocol sending unit may determine that audio MDEs include a fixed number of audio frames.

As another example, to determine the locations of the MDEs (e.g., to form the MDEs), the file-based protocol sending unit may be configured according to rules that define locations of various types of media data, such as audio data, video data, and/or timed text data, in the stream. The rules may define, for example, an arrangement of the various types of media data in the stream, such that the file-based protocol sending unit can differentiate between the types of media data and allocate the types of media data to respective MDEs.

In addition, the file-based protocol sending unit may also determine one or more delivery time requirements (also referred to as transmission time requirements) for the MDEs, where the transmission time requirements represent times at which the MDEs are to be sent to the client device. For example, the transmission time requirements may represent earliest and/or latest times at which the MDEs are to be sent to the client device. MDEs may have earliest time requirements at which the MDEs can be sent to the client device in order to, for example, prevent a buffer overflow at the client device. MDEs may also have latest time requirements at which the MDEs can be sent to the client device in order to, for example, prevent a buffer underrun at the client device.

The file-based protocol sending unit may then send the MDEs to the physical layer sending unit, along with data representative of the transmission time requirements. In particular, the file-based protocol sending unit may determine available delivery slots for the physical layer sending unit, and send the MDEs and transmission time requirement data to the physical layer sending unit such that the physical layer sending unit is able to deliver the MDEs according to the transmission time requirements.

The source device discussed above may be configured to stream data according to an HTTP streaming protocol, such as DASH. In HTTP streaming, frequently used operations include HEAD, GET, and partial GET. The HEAD operation retrieves a header of a file associated with a given uniform resource locator (URL), uniform resource name (URN), or uniform resource identifier (URI), without retrieving a payload associated with the URL, URN, or URI. The GET operation retrieves a whole file associated with a given URL, URN, or URI. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more Segments. Each representation may include an initialization Segment, or each Segment of a representation may be self-initializing. When present, the initialization Segment may contain initialization information for accessing the representation. In general, the initialization Segment does not contain media data. A Segment may be uniquely referenced by an identifier, such as a uniform resource locator (URL), uniform resource name (URN), or uniform resource identifier (URI). The MPD may provide the identifiers for each Segment. In some examples, the MPD may also provide byte ranges in the form of a range attribute, which may correspond to the data for a Segment within a file accessible by the URL, URN, or URI.

Different representations may be selected for substantially simultaneous retrieval for different types of media data. For example, a client device may select an audio representation, a video representation, and a timed text representation from which to retrieve Segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., Segments) of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video Segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for Segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a Segment of one of representations 68, e.g., using a URL or URI of the Segment. In some examples, the requests may also specify one or more byte ranges of the Segment, thus comprising partial GET requests. Request processing unit 70 may further be configured to service HTTP HEAD requests to provide header data of a Segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS or DVB-T/T2. Content preparation device 20 may create DASH Segments and/or sub-segments in substantially the same way as described, but server device 60 may deliver these Segments or sub-segments using eMBMS, DVB-T/T2 or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

Furthermore, network interface 72 of server device 60 may be configured to perform the techniques of this disclosure. Additionally or alternatively, request processing unit 70 and network interface 72 may be configured to perform the techniques of this disclosure. For purposes of explanation, it is assumed that network interface 72 includes sub-components that are not explicitly shown in FIG. 1, such as the various examples discussed in greater detail below. For example, network interface 72 may include a sender, a scheduler, a framer, and an exciter amplifier. In addition, in this example, encapsulation unit 30 represents an example of a segmenter (i.e., a unit that forms Segments of media data, where the Segments represent individual files associated with respective URLs/URIs). In particular, encapsulation unit 30 may encapsulate MDEs in Segments, where each Segment may include one or more MDEs.

In accordance with the techniques of this disclosure, encapsulation unit 30 may provide a stream of Segments of media data to server device 60, which ultimately directs the stream of Segments to network interface 72 for transmission to client device 40. The stream of Segments may correspond to a representation, such as one of representations 68.

Furthermore, encapsulation unit 30 may provide data representing transmission time requirements for MDEs included in the Segments to server device 60, which again, ultimately directs the transmission time requirements to network interface 72. For example, the transmission time requirements may be specified within manifest file 66. The transmission time requirements generally indicate earliest and/or latest times at which the MDEs are to be delivered to client device 40. Thus, network interface 72 may send the MDEs (e.g., Segments or byte ranges of Segments) to client device 40 in accordance with the transmission time requirements. For example, network interface 72 may deliver the MDEs such that the MDEs arrive no earlier than the earliest transmission times and/or no later than the latest transmission times at client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access Segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve Segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of Segments of a selected representation to retrieval unit 52, which may in turn provide the Segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of Segments of representations 68. That is, the MPD may include information indicating the wall-clock time at which a first Segment of one of representations 68 becomes available, as well as information indicating the durations of Segments within representations 68. In this manner, retrieval unit 52 of client device 40 may determine when each Segment is available, based on the starting time as well as the durations of the Segments preceding a particular Segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Certain elements of the example of FIG. 1 may be configured to perform the techniques of this disclosure. For example, network interface 72 and/or request processing unit 70 may be configured to operate independently or in conjunction to perform the techniques of this disclosure.

Figure 2:
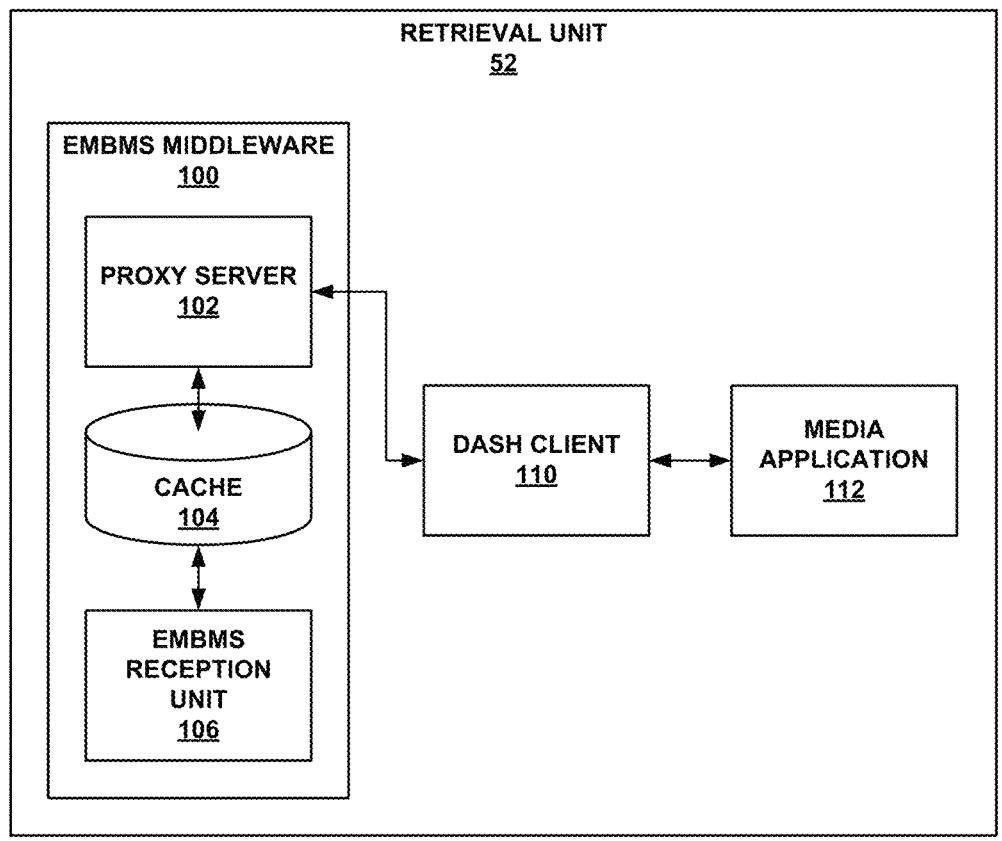
FIG. 2 is a block diagram illustrating an example set of components of retrieval unit 52 of FIG. 1 in greater detail.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a BM-SC.

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Local server unit 102 may act as a server for DASH client 110. For example, local server unit 102 may provide a MPD file or other manifest file to DASH client 110. Local server unit 102 may advertise availability times for Segments in the MPD file, as well as hyperlinks from which the Segments can be retrieved. These hyperlinks may include a localhost address prefix corresponding to client device 40 (e.g., 127.0.0.1 for IPv4). In this manner, DASH client 110 may request Segments from local server unit 102 using HTTP GET or partial GET requests. For example, for a Segment available from link http://127.0.0.1/repl/seg3, DASH client 110 may construct an HTTP GET request that includes a request for http://127.0.0.1/repl/seg3, and submit the request to local server unit 102. Local server unit 102 may retrieve requested data from cache 104 and provide the data to DASH client 110 in response to such requests.

Figure 3:
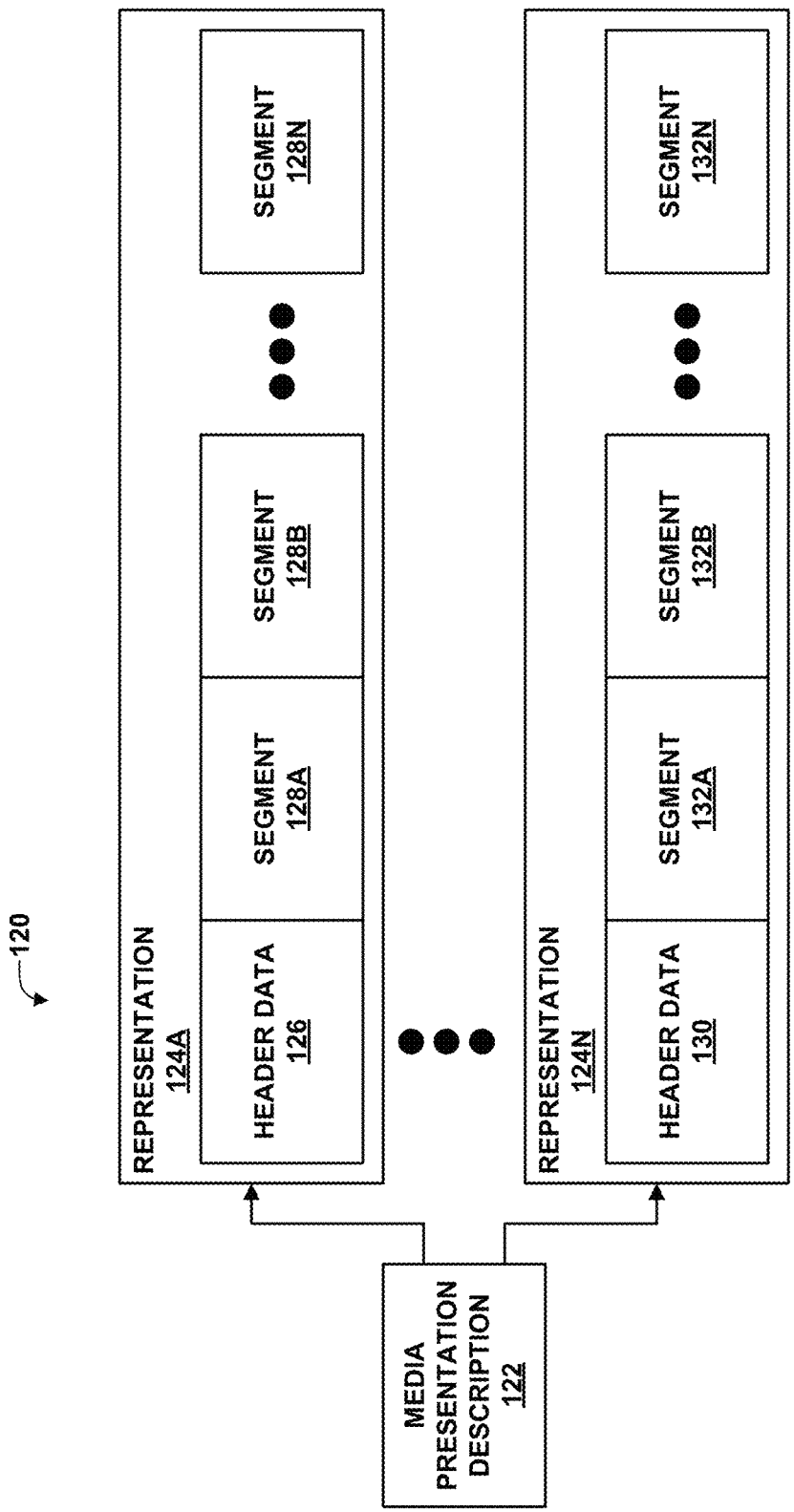
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and Segments 128A-128N (segments 128), while representation 124N includes optional header data 130 and Segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 2. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of Segments 128, e.g., temporal locations of random access points (RAPs, also referred to as stream access points (SAPs)), which of Segments 128 includes random access points, byte offsets to random access points within Segments 128, uniform resource locators (URLs) or URIs of Segments 128, or other aspects of Segments 128. Header data 130, when present, may describe similar characteristics for Segments 132. Additionally or alternatively, such characteristics may be fully included within MPD 122.

Segments 128, 124 include one or more coded video samples, each of which may include frames or slices of video data. Each of the coded video samples of Segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of Segments 128, 132 may be associated with a unique uniform resource locator (URL) or URI. Thus, each of Segments 128, 132 may be independently retrievable using a streaming network protocol, such as DASH. In this manner, a destination device, such as client device 40, may use an HTTP GET request to retrieve Segments 128 or 132. In some examples, client device 40 may use HTTP partial GET requests to retrieve specific byte ranges of Segments 128 or 132.

Figure 4:
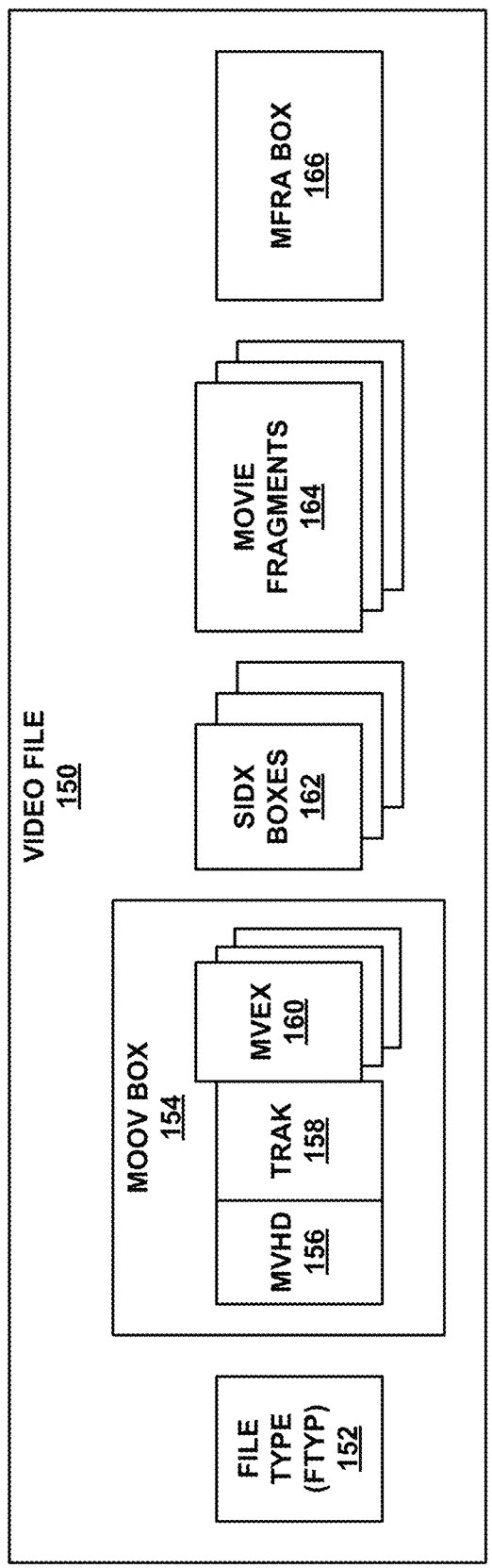
FIG. 4 is a block diagram illustrating elements of an example video file, which may correspond to a Segment of a Representation.

FIG. 4 is a block diagram illustrating elements of an example video file 150, which may correspond to a Segment of a Representation, such as one of Segments 114, 124 of FIG. 3. Although the example of FIG. 4 illustrates a video file, it should be understood that an audio file or other file may include similar data to that of video file 150. Each of Segments 128, 132 may include data that conforms substantially to the arrangement of data illustrated in the example of FIG. 4. Video file 150 may be said to encapsulate a Segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

Figure 7:
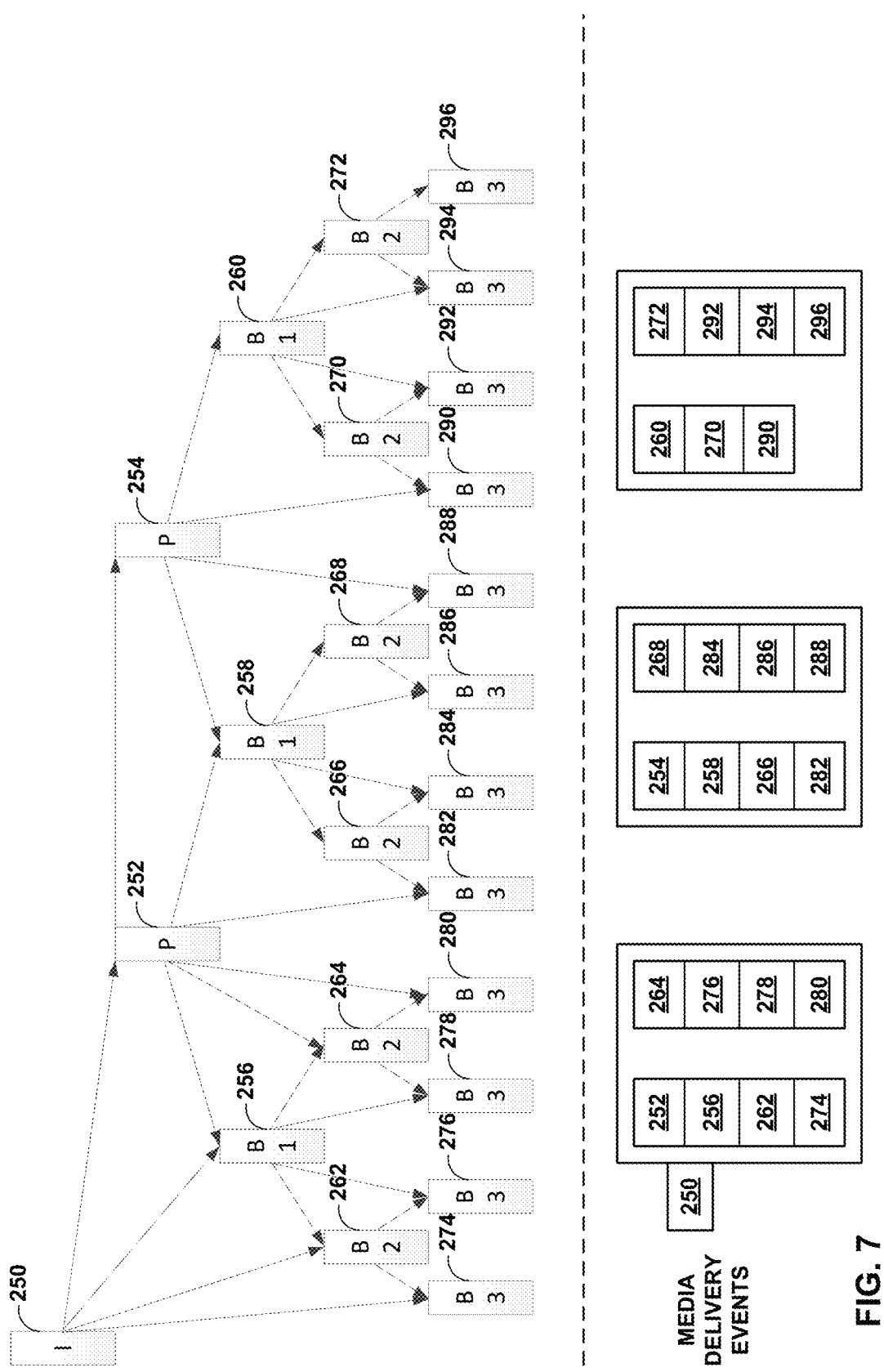
FIG. 7 is a conceptual diagram illustrating an example frame type cadence and corresponding defined MDEs.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150. FIG. 7, discussed in greater detail below, provides additional information with respect to the MPD update box.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a Segment (e.g., a Segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the Segment. The referenced size gives the count of the number of bytes in the material referenced."

SIDX boxes 162 generally provide information representative of one or more sub-segments of a Segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a Segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the Segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
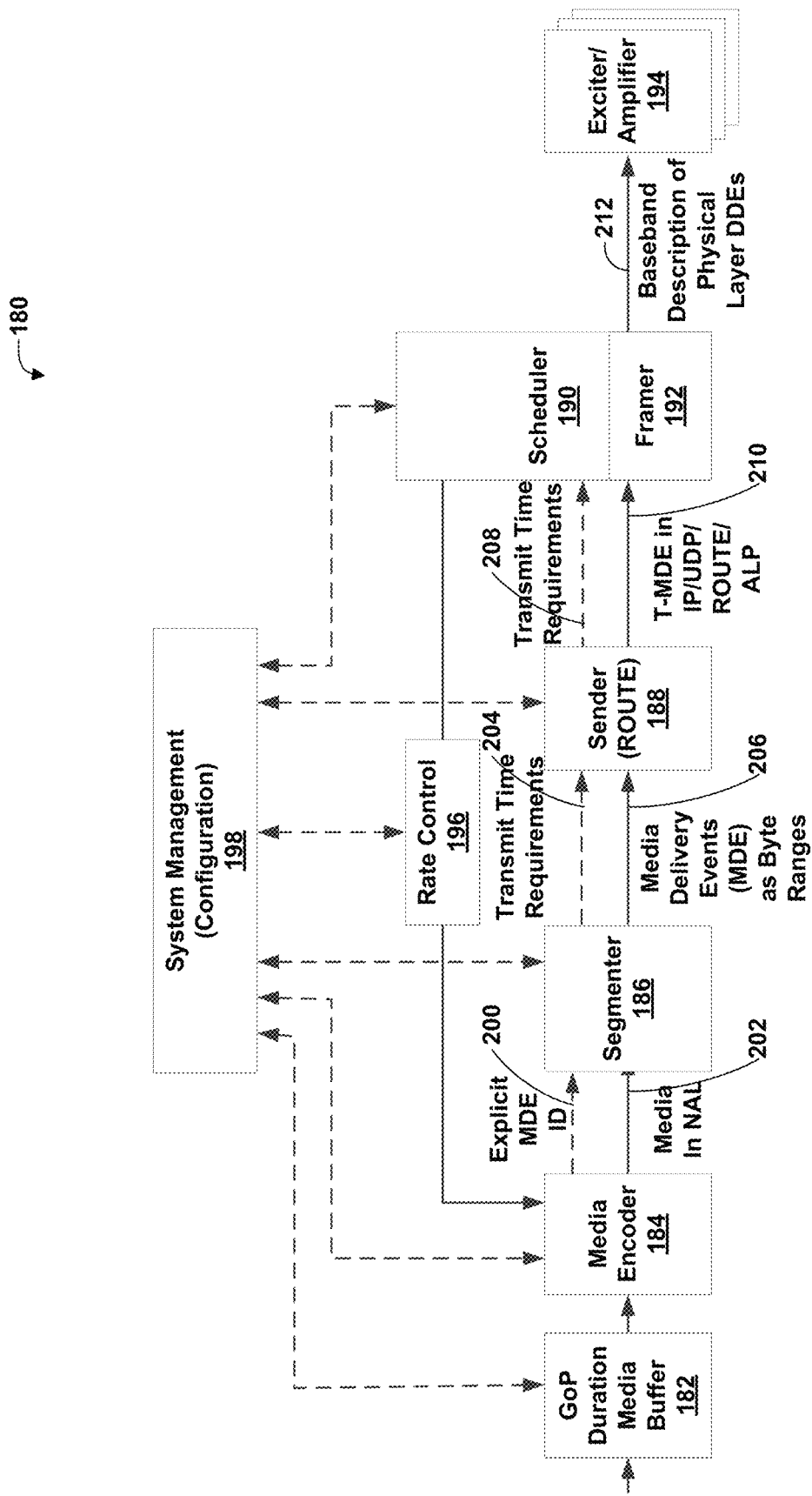
FIG. 5 is a block diagram illustrating an example broadcast Dynamic Adaptive Streaming over HTTP (DASH) infrastructure system.

FIG. 5 is a block diagram illustrating an example broadcast DASH infrastructure system 180. System 180 includes a system management unit 198, a GOP duration media buffer 182, a media encoder 184, a segmenter 186, a sender 188, a scheduler 190, a framer 192, and an exciter/amplifier 194. System 180, and thus each of these components of system 180, may be included in a source device, such as server device 60 of FIG. 1 or content preparation device 20 of FIG. 1. Again, a server device and a content preparation device may be functionally integrated into a single device.

In the example of system 180, GOP duration media buffer 182 receives and buffers media data to be encoded. Media encoder 184 (which may actually represent a plurality of media encoders, such as audio encoder 26 of FIG. 1 and video encoder 28 of FIG. 1) encodes media data (e.g., audio data, video data, and/or timed text data), encapsulates the media data into network abstraction layer (NAL) units, and provides the encoded media data, in NAL unit form 202, to segmenter 186. In addition, media encoder 184 sends data representing explicit MDE identifiers 200 to segmenter 186.

Segmenter 186 encapsulates the received NAL units into respective Segments. Thus, in general, segmenter 186 does not provide explicit information indicative of the locations of the MDEs within the Segments. Effectively, however, segmenter 186 provides the MDEs to sender 188, in the form of byte ranges within the Segments (206). Furthermore, segmenter 186 also determines transmission time requirements 204 for the MDEs and sends data representative of the transmission time requirements 204 to sender 188.

Sender 188 represents an example of a file-based protocol sending unit in accordance with the techniques of this disclosure. In this example, sender 188 sends data of the received Segments according to ROUTE. In other examples, sender 188 may send data of the received Segments according to FLUTE or other such file-based protocols. In accordance with the techniques of this disclosure, sender 188 sends both the MDE data (encapsulated within network-based data units, e.g., IP, UDP, ROUTE, ALP, or the like) 210 and transmission time requirements 208 to scheduler 190 and framer 192. Framer 192 forms network frames that encapsulate the network data to exciter/amplifier 194 according to schedule data determined by scheduler 190, where the network frames further include a baseband description of physical layer data delivery events (DDEs) 212. Exciter/amplifier 194 actively transmits the data, e.g., via the physical network layer, such as via an ATSC OTA broadcast, Ethernet, or the like.

A broadcast system, such as an Advanced Television Systems Committee (ATSC) system, may support the use of media aware byte ranges implemented with MDEs within ROUTE or other object delivery protocol(s) including media aware byte ranges. The identification (definition) of the individual MDEs for the system may be required behavior, so the system can deliver the MDEs. That is, the system must be able to determine what media aware byte ranges represent an MDE (or similar data object) in order to package and send the MDE to the Scheduler with the appropriate time labeling.

An example definition of an MDE is a media aware byte range of media that is meaningful to a receiving media codec. Due to the frame structure of a codec, an MDE may or may not be multiple samples in the ISO BMMF usage of the term sample. An audio frame in High-Efficiency Advanced Audio Coding (HE-AAC) (ISO/IEC JTC1/SC29/WG11/N7016 (Jan. 11, 2005)), which contains multiple audio samples, is itself a single sample in an ISO BMFF context. An ISO BMFF sample in an HEVC context can be a single frame of video data. An MDE may include a single or multiple ISO BMFF samples. This possibility exists due to the interdependence among successive video frames. There is a smallest possible MDE, but for convenience or other purposes, these atomic MDEs, i.e., smallest possible MDEs, can be aggregated into a larger MDE. MDEs in general terms do not overlap.

The elements of system 180 in FIG. 5 that may be first aware of MDEs are media encoder 184, segmenter 186, and sender 188. The functional entities in FIG. 5 are conceptual. This logical construct of the cascade is for convenience in considering the system and not required. The functions could be functionally integrated into a single entity, or possibly subdivided among additional or alternative units in a different manner. A logical location of MDE formation is within the scope of media encoder 184, segmenter 186, or input section of sender 188.

The scope and definition of an MDE is defined according to the media type being handled. For example, audio may be packaged into separate Segments or multiplexed within Segments i.e., ISO BMFF files/objects. MPEG DASH (INTERNATIONAL STANDARD ISO/IEC 23009-1 Second edition 2014-05-01 Information Technology—Dynamic Adaptive Streaming Over HTTP (DASH) Part 1: Media Presentation Description and Segment Formats), for example, defines both multiplexed and non-multiplexed Segments. This is merely one aspect of configuration. As shown above in FIG. 5, there can be a system configuration function that supplies configuration to the various functions.

Examples of some potentially configured aspects include:
For DASH
  Segment duration
  Segment composition i.e., media types contained in a specific media object
  Segment type cadence e.g. a specific Media Segment contains a Stream Access Point (SAP) or not
For a video encoder
  GoP duration (specific codec naming varies for such structures)
  GoP types e.g. open or closed
  Frame type cadence e.g. I, B, B, P, B, B, P . . .
  Frame rate, resolution, progressive vs. interlace etc.
  MDE boundaries via pattern match or from allowed media structures e.g.
    Audio frame is an atomic MDE and ISO BMFF sample
    Individual I (IDR) frame is an atomic MDE
    Groups of video frames are atomic MDEs as depicted in FIG. 3
    Such determination may be made or known in the Encoder or determined by Segmenter
For an audio encoder
  Sample rate
  Selection of coding tools
  Details of audio frame construction according to specified codec To the extent that these aspects are static configurations, the associated MDE definitions can be provided as static definitions, i.e., the configuration of the encoder is known to the Segmenter and or Sender, because it a static configured set of settings. Assuming that the video runs a single defined cadence of video frame types the MDE boundaries may defined by the configuration. See FIG. 7 below for an example of a specific video cadence and its atomic MDEs. It should be noted that this figure depicts the display order of the video frames.

FIG. 6 is a conceptual diagram illustrating an example high level composition of MDEs.

FIG. 7 is a conceptual diagram illustrating an example frame type cadence and corresponding defined MDEs. In particular, FIG. 7 illustrates video frames 250-296. The various video frames are labeled as either I, P, or B, to represent whether the frames are intra-predicted (I), unidirectionally inter-predicted (P), or bi-directionally inter-predicted (B).

The video frames depicted in FIG. 7 are illustrated in display order. Were the figure drawn in delivery order the frame groupings would appear as a contiguous byte ranges in the source stream from the video encoder and within the ISO BMFF container, i.e., a Media Segment for DASH.

The identification of MDE boundaries for such a defined cadence can be accomplished via tables, which for example define the first N video frames of GoP to be MDE 1, next M frames to be MDE 2, etc., or specific cadence of frame types, e.g., pattern match, which is recognized in the codec syntax. The use of the table method is simple and convenient, if the cadence of the frame types is static on a per Segment basis. This is potentially a convenient method for audio media type for which there may be a fixed number of audio codec frames per MDE and per codec. (This is also an example of a trivial rule.) These tables that may contain an explicit description of a pattern or rules may be expressed as XML. FIG. 7 shows that some atomic MDEs maybe aggregated to form a larger MDE. This may be determined via rule or pattern match or combination thereof. These methods may be implemented within the media encoder and passed forward as explicit description to the Segmenter and Sender e.g. ROUTE or MMT.

As briefly mentioned above the configuration table may be formed according to a rule. The logic of such a rule can allow the operation of the MDE (media aware byte range) identification function to be adaptive. This is convenient for example if a Segment (ISO BMFF Object) is multiplexed, i.e., contains multiple media types. The MDE identification function of the Segmenter can parse for example closed captions, audio, and video. Further the cadence of for example video frame types may be adaptive.

Examples of adaptive aspects of video from an MDE perspective include:
  Video frame type cadence to enable open and closed GoPs in a sequence of Segments
  Video frame count and type cadence on a per Segment or Period basis
    E.g., 24 fps commercials and 30 fps content interspersed Such a change in frame rate can cause a video frame type cadence change and as consequence the MDE cadence.

Techniques are described for supporting MDE identification within Segments, i.e., media aware byte ranges that are contextually relevant to an associated media codec in support of byte range aware protocol, for example ROUTE or MMT.

Examples of techniques to support such MDE definition, i.e., media codec aware byte ranges, may include:
Tabular methods describing specific sequences, such as:
Video frame type
Sequences of video frame types
Number of for example video or audio frames
Combinations of described structures
Pattern match of specific sequence of for example video frame types
These methods implemented in a media encoder, Segmenter or Sender
Rule based MDE based detection
For example, a specific configuration of an HEVC codec may allow these logical constructs of frame type sequences:
Start of frame sequence (MDE) meets this a first set of conditions.
End of frame sequence (MDE) meets a second set of conditions.
Sequence of frame types meets a third set of conditions.
The described pattern and rule methods may be combined, for example:
This pattern is discovered
then this rule should be applied
A media encoder may have a library of defined operational modes with specific MDE constructions.
Media encoder communicates said operational mode in real time with encoded media passed to the Segmenter
See Appendix A for example of XML or file rule based logic and pattern based logic.

Each MDE may be defined with an earliest and/or latest transmission time. This is for the benefit of the Scheduler, whose task it is to assign media to delivery slots, e.g. specific FEC Frames in ATSC 3.0 on the physical layer. These earliest and latest attributes may be constrained by different aspects, such as:
Earliest transmission time: This is literally the instant the first bit of a given MDE (or Segment) may radiate. This earliest radiated bit includes all the related encapsulating protocol.
Latest transmission time: This is literally the last instant that the last bit of an MDE (or Segment) has to be radiated. This last bit includes all related encapsulating protocol.

The earliest transmission time may be constrained by system configuration. For example, the physical layer frame cadence could have frames that start on whole second boundaries of ATSC physical layer time (48b TAI seconds, 10b msec or possibly other fraction of second). This physical layer frame cadence may or may not be directly related to Media Segment duration(s). A given Period of a program for example could have to be delivered in its entirety before the end of the whole second preceding an ad that is replacement ad. The trailing replacement ad for example shall not start delivery until at least the next whole second starts. For times away from the Period boundaries the earliest transmission time might be in a for example preceding whole second.

The latest transmission time may be related to the decode time of the last decoded media contained within a labeled MDE. The labeling applied to Media Segment level delivery may be determined by the nominal DASH/Segment availability time line. The latest transmission time may be consistent with meeting the delivery deadline for the Segment. The latest transmission time requirement for the last MDE (media aware byte range) of a Segment may be the same as the completed Segment.

Figure 8:
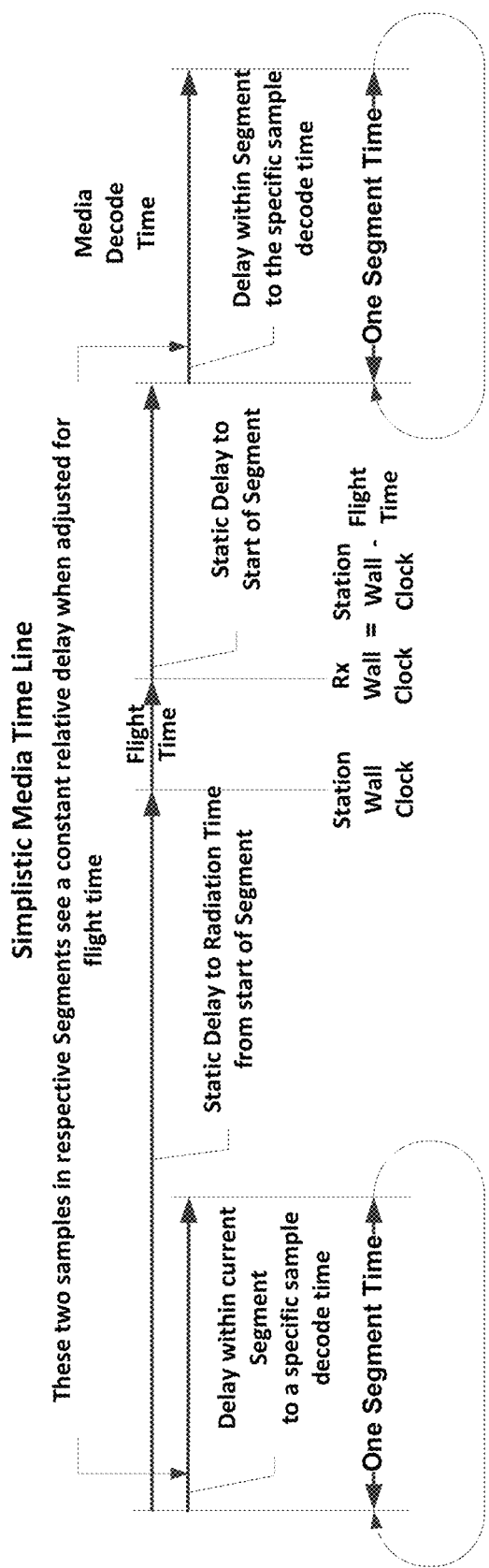
FIG. 8 is a conceptual diagram representing a simple view of system time.

FIG. 8 is a conceptual diagram representing a simple view of system time. That is, FIG. 8 portrays a top level view of system time. This is the case for either Segment level playback or byte range based playback. One difference for MDE playback is the static receiver delay can be notably shorter than for Segment playback. The Station Wall Clock time may be delivered to the receiver via the physical layer and supporting protocol. The Receiver Wall Clock at any instant, after synchronization is the current Station Wall Clock Time minus the then current signal flight time from the dominate transmitter to the receiver.

Figure 9:
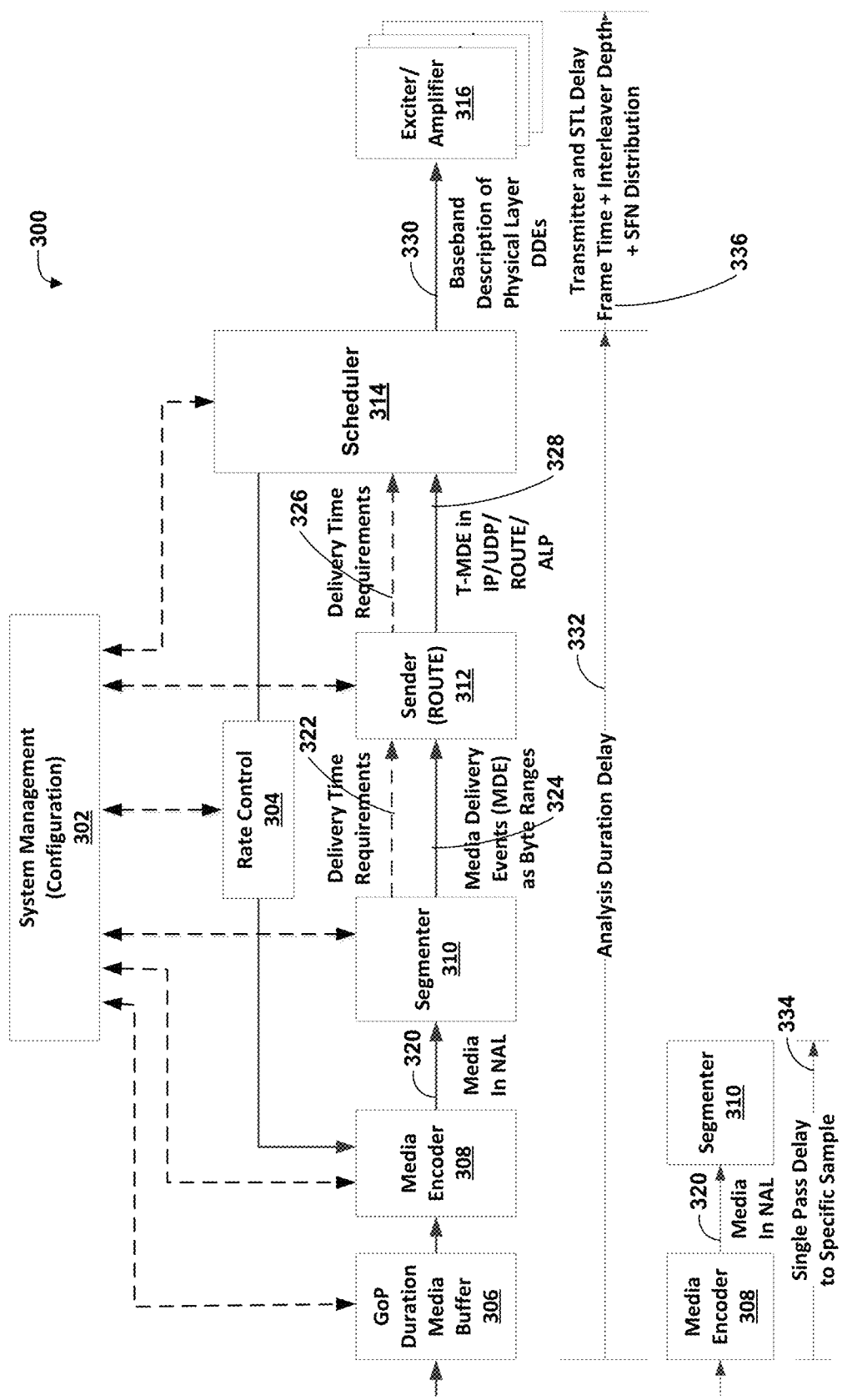
FIG. 9 is a block diagram representing a time relationship in a transmit infrastructure.

FIG. 9 is a block diagram representing system 300, which represents a transmit infrastructure that is configured with a time relationship. That is, FIG. 9 provides a conceptual representation at how time delays may impact the transmit process of system 300. In this example, system 300 includes GOP duration media buffer 306, media encoder 308, segmenter 310, rate control 304, system management unit 302, sender 312, scheduler 314, and exciter/amplifier 316.

In this example, GoP duration media buffer 306 stores (that is, buffers) raw media data to be encoded. Media encoder 308 retrieves media data to be encoded from GoP duration media buffer 306, encodes the media data, encapsulates the encoded media data in NAL unit form, and delivers the NAL units 320 to segmenter 310. It should be understood that the encoded media data also includes MDEs, e.g., as shown in FIG. 7. Moreover, as explained above, each of the MDEs may have transmission time requirements, such as earliest transmission and/or latest transmission time requirements.

Segmenter 310 receives the NAL units 320 from media encoder 308 and encapsulates one or more MDEs (that is, one or more of the NAL units) in respective Segments. Again, the Segments may correspond to independently deliverable files associated with respective URLs, where the URLs may each uniquely identify the corresponding Segment. The MDEs may correspond to respective byte ranges of the Segments. In addition, Segmenter 310 may determine transmission time requirements for each of the MDEs, and pass both the transmission time requirements 322 and MDEs (in the form of byte ranges of the Segments) 324 to sender 312.

Sender 312 may operate according to a file-based delivery protocol, such as ROUTE. Thus, sender 312 may encapsulate respective portions of the Segments (e.g., the MDEs) in respective network-based delivery units 328, such as packets or frames, to scheduler 314 for transmission. In addition, sender 312 provides the transmission time requirements 326 to scheduler 314, such that scheduler 314 can deliver the network-based delivery units to a client device (not shown in FIG. 9) according to the transmission time requirements. More particularly, scheduler 314 forms a baseband description of physical layer data delivery events (DDEs) 330 and passes the baseband description of physical layer DDEs 330 to exciter/amplifier 316. Then, exciter/amplifier 316 transmits data at the physical layer to, e.g., the client device.

FIG. 9 also represents various delays introduced by system 300 when sending media data to a client device. For example, the time between media data being buffered to the media data being scheduled for transmission is referred to as analysis duration delay 332. The analysis duration delay particularly includes single pass delay for a specific sample 334, which is the time between media encoder 308 encoding the sample and encapsulating the sample in a NAL unit and providing the NAL unit to segmenter 310, as shown in FIG. 9. Moreover, the time between having scheduled data for transmission and the data actually being transmitted is referred to as transmitter and STL delay 336.

Defining time for media data is a matter of considering how far before radiation time the various functional blocks of the transmit infrastructure of system 300 have to be operating and how long after reception the media will be handed off to media decoder(s). This discussion is accordingly divided into prior to radiation and after receipt. Why is the actual radiation time essential? In order to accomplish a potential synchronous switch among source streams for an application such as personalized ad insertion. The actual time that bounds transmission of media may be constrained. The time delivered to the receiver is synchronized to radiation time of the bootstrap feature of the physical layer. The time span that a specific Period is present on the physical layer has to be understood and controlled. An MDE or Media Segment is labeled with a range of time that it is allowed to be radiated, so all process prior to actual emission are offset in time by typically a constant delay associated to a specific block or function. FIG. 9 depicts a plausible organization of time domains within the transmit infrastructure. This partition is not a requirement it is merely convenient from a conceptual perspective. Below is a listing of some possible time domains and their plausible durations.

Transmitter and Studio Transmitter Link (STL) Delay 336: The defined delay across these blocks is long enough that a given physical layer frame just starting to be delivered to the STL can start to be output by the transmitter, when this period has elapsed. This delay nominally includes at least a physical layer frame duration, an interleaver duration and longest transmit delay in the SFN distribution network. One could consider running this delay shorter, for example, on a subframe basis. Supporting subframes potentially may cause an increased peak rate on the studio on studio transmitter link i.e., the studio transmitter link must sustain maximum allowed throughput of the physical layer for at least a subframe duration. The constraint on a full frame implementation is peak allowed rate allocation as measured on a full frame basis, which could be lower than per subframe, although it could be the same if all active PLPs are of the same capacity.

Analysis Duration Delay 332: One of the tasks of scheduler 314 is to assign media to the physical layer in a manner that meets its defined time deadlines, and meets the capacity constraints per the current physical layer PLP definitions. In order to accomplish this, scheduler 314 should analyze at least the longest duration of a physical layer frame worth of media. Scheduler 314 could ultimately fail if it does not successfully schedule at least one physical layer frame time of encoded media per elapsed physical layer frame time. This is a cumulative task. A physical layer frame with less than its duration of media time may be offset with a physical layer frame that represents more media time.

The duration of a physical layer frame maybe shorter than the duration of the longest Media Segment or GoP duration. For such a case the limiting bound is related to at least the longest Media Segment duration or GoP duration is the GoP is comprised of multiple Media Segments. Scheduler 314 may ensure that the longest duration Media Segment/GoP is successfully scheduled. Scheduler 314 may further generate at least one second of encoded Media Segment/GoP per media second. As described here, Analysis Duration Delay 332 is not constant, as scheduler 314 has Latest Radiation Time—Earliest Radiation Time flexibility in the actual radiation time.

Single Pass Delay 334: Were the input media streamed directly upon media encoder 308 and segmenter 310, there would be a decode delay that is static for a given configuration from input of a first frame of a GoP to the decode time of the first decoded frame, as described in the resulting first Segment. This is a conceptual construct.

It may be the case that media encoder 308 (which may represent multiple encoders) can very likely produce more than one media time of encoded content per Media Segment time. The actual constraints are likely defined by the number of "passes" the encode scheme utilizes. In this context, a "pass" is one instance of a media encode. If media encoder 308 were able to meet all targets on one encode pass, then the requirement would be at least one Media Segment duration of media per elapsed Media Segment time. It is fairly challenging to get the desired data size on the first pass, so a Scheduler may try to limit passes to two pass encoding. In two-pass encoding, a first pass may provide a calibration on the complexity of the media data that is to be encoded, and a second pass may be used to adjust decisions made during the first pass to meet the capacity of the physical layer. If the initial encoding pass results in data sizes that are substantially different than the final desired/required data size, then a third pass or other adjustment to date rate may be performed. It should be noted the Scheduler has to work with actual data size to be delivered in the physical layer including all encapsulation.

Assuming that the media is streaming to media encoder 308 in real time, and this is a multiple pass encoding scheme, there is potentially a full GoP delay required to capture the real time streaming media ahead of the media encoder(s). The decode times provided with the encoded media at the receiver must reflect the entire delay of the infrastructure and receiver. It is expected that these are based on Media Segment playback. MDE times can be calculated from the MDE RAP start up point relative to what would have occurred for Segment level playback.

Figure 10:
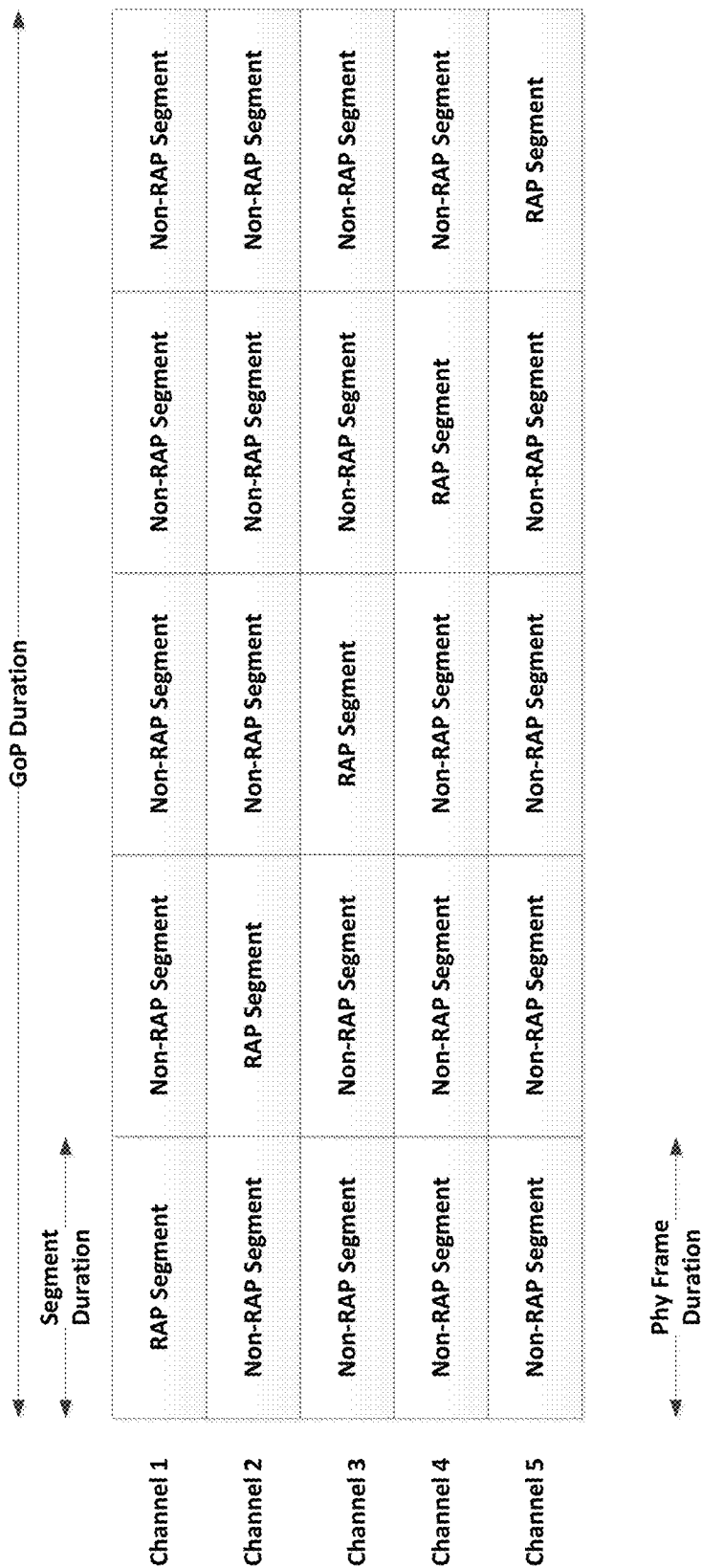
FIG. 10 is a conceptual diagram illustrating multiple Segments per group of pictures (GOP) with a staggered random access point (RAP) location.

FIG. 10 is a conceptual diagram illustrating multiple Segments per GOP with a staggered RAP location. A staggered RAP Segment time as illustrated in FIG. 10 (i.e., multiple analysis durations per GoP) may reduce the minimum required capture time prior to scheduling of media and hence lower overall latency. This has somewhat limited stat multiplexing benefits because, as illustrated, the data rate for a given physical layer frame is dominated by a single RAP Segment data size. The time labeling of the media is captured with the media.

As described above, the transmit delay, or delay to radiation, may be expressed as:

Analysis Delay Duration−Single Pass Delay to Specific Sample+Transmitter and STL Delay (Frame Time+Interleaver Depth+SFN Distribution)

Figure 11:
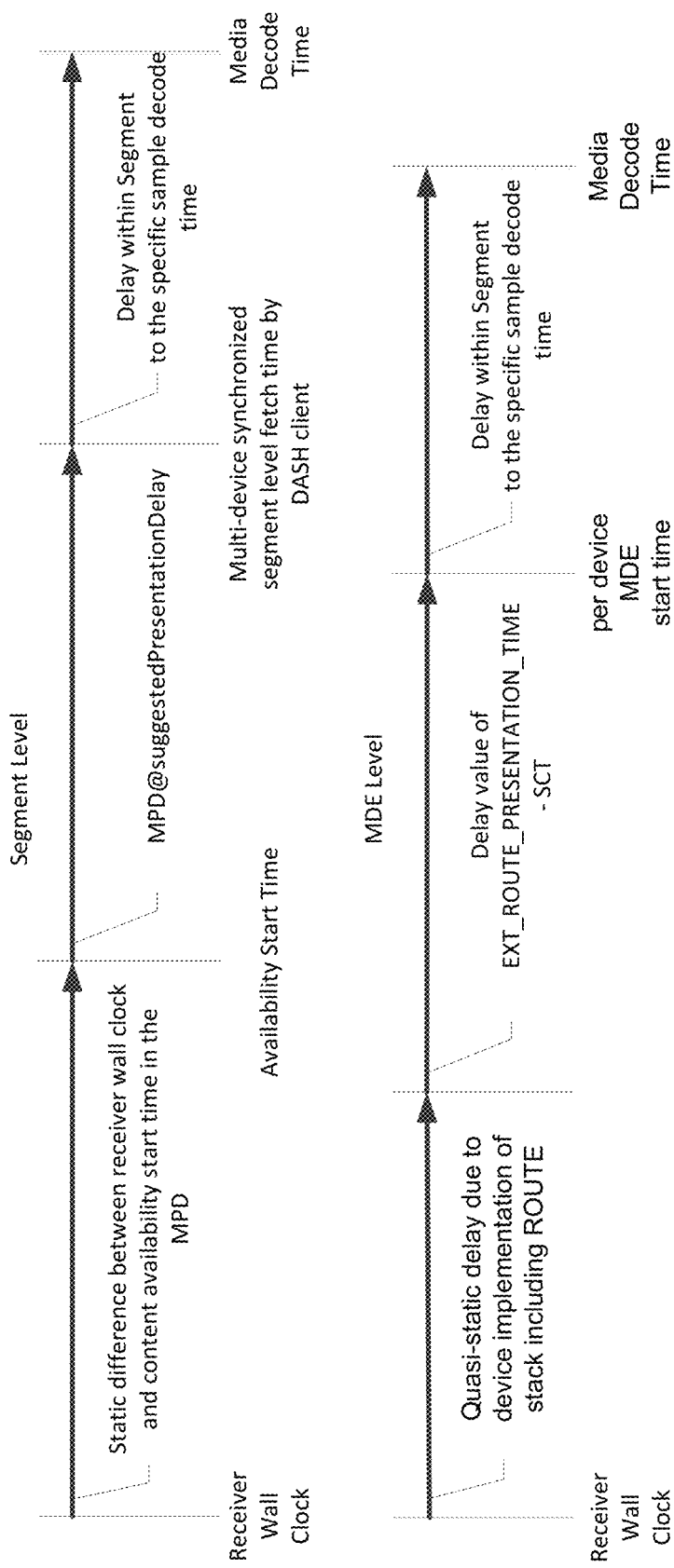
FIG. 11 is a conceptual diagram illustrating a minimum delay to decode time for media playback.

FIG. 11 is a conceptual diagram illustrating a minimum delay to decode time for media playback. That is, FIG. 11 depicts the minimum delays that impact the media decode times for Media Segment and MDE playback. One difference between Media Segments and MDE playback is that the start time for MDE playback at the Segment level delay must consider the longest stack delay plus a suggested presentation delay, while the MDE level playback is the actual delay of the individual device static plus a delay to assure the ROUTE buffer fullness is sufficient. The total MDE delay value may be less than a Segment time.

Total end to end segment decode delay may be expressed as:

Analysis Delay Duration−Single Pass Delay to Specific Sample+Transmitter and STL Delay (Frame Time+Interleaver Depth+SFN Distribution)+ Flight Time+Delay to Availability Start Time+ MPD@suggestedPresentationDelay+Delay within Segment to Specific Sample Total end to end MDE decode delay may be expressed as:

Analysis Delay Duration−Single Pass Delay to Specific Sample+Transmitter and STL Delay (Frame Time+Interleaver Depth+SFN Distribution)+ Flight Time+Delay Arrival at ROUTE or Similar MMT Receiver+Streaming Byte Range Hold-off Time+Delay within Segment to Specific Sample Certain details of time metadata methods for scheduling have been discussed above. Further details of time metadata methods for scheduling are discussed here. The construction of time metadata for MDE(s) can be based on an anchor point defined by the latest required transmission time due to a Segment start. The required latest time for an MDE may be linear in order of first decode time of each respective MDE after the Segment start. The latest time may be constrained by the decode time of the current to be decoded sample in the MDE, relative to the first decoded sample of the Segment, which is also the first decoded MDE of the Segment. This sort of method is linear in decode time, which is only one approach to defining latest transmission time metadata.

There are additional aspects to consider, for example, possibly front loaded media components such as audio and captions. Since these media components are small relative to video, but the complete presentation may not play without them, it is possibly simplest to send them ahead of video RAP, but after possibly required metadata objects such as MPD and IS. This is, in general, a method that may be used to ensure that all the required small data objects are delivered first.

Figure 12:
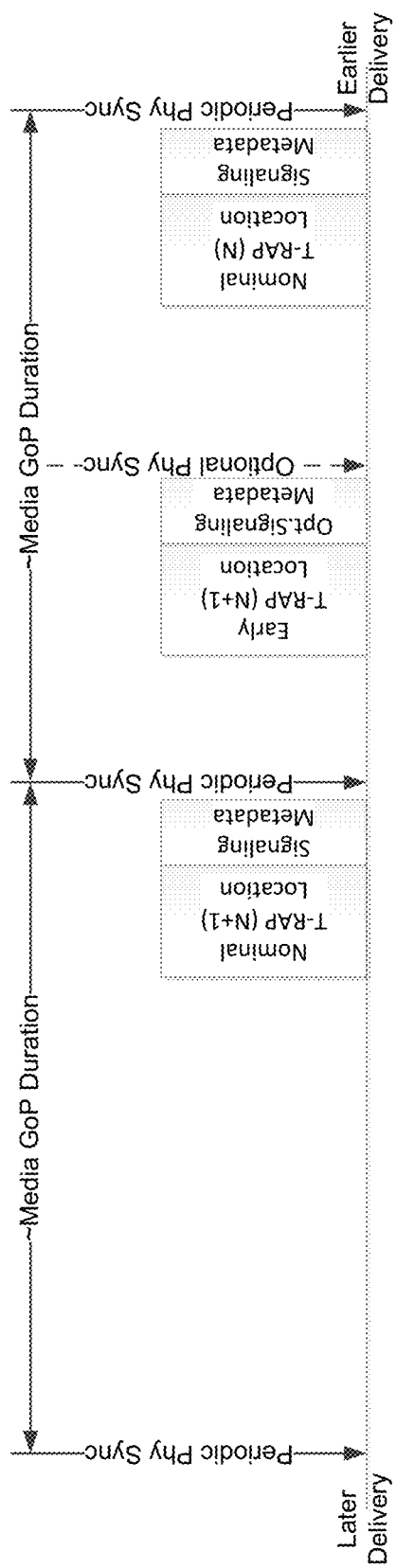
FIG. 12 is a conceptual diagram illustrating optional physical layer synchronization and related metadata.

FIG. 12 is a conceptual diagram illustrating optional physical layer synchronization and related metadata. The relationship of the physical layer frames to the T-RAP is relevant aspect with respect to the earliest transmission. For example, consider the example of FIG. 12, showing earliest time the freedom to move ahead of the nominal physical frame start. This can impact the channel change time, unless there is a complete sequence of start metadata in all layers.

The design of a physical layer may or may not be able to render synchronization precisely on GoP boundaries as depicted above. The definition of synchronization position may be constrained to other locations by the numerology of the physical layer. A viable method is to use a location near the GoP duration. Near could be for example next available time i.e., before nominal boundary of preceding traffic bearing transform or after. The scale of time for a minimum transform may be in the scale of 1 msec, while maximum may be in range of 10 msec.

The scheduling function may nominally consider a fixed block of time, possibly related to the media GoP duration or Segment duration as previously depicted. For the more efficient GoP duration scheme, it is possible that the all the media can be scheduled and some significant capacity may be left available in (N) for potential use by the next analysis interval (N+1). In such a condition, the Scheduler may attempt to fill this capacity in (N) with media from the next analysis interval (N+1). This can be enabled by the time metadata, allowing transmission in an earlier interval via the earliest parameter. Once the filled portion of the proceeding interval is known, the physical layer component may insert an optional frame synchronization element, provided for the purpose of allowing acquisition of media services earlier than would be possible with the quasi fixed periodic framing, e.g., bootstrap and preamble of ATSC 3.0.

Figure 13:
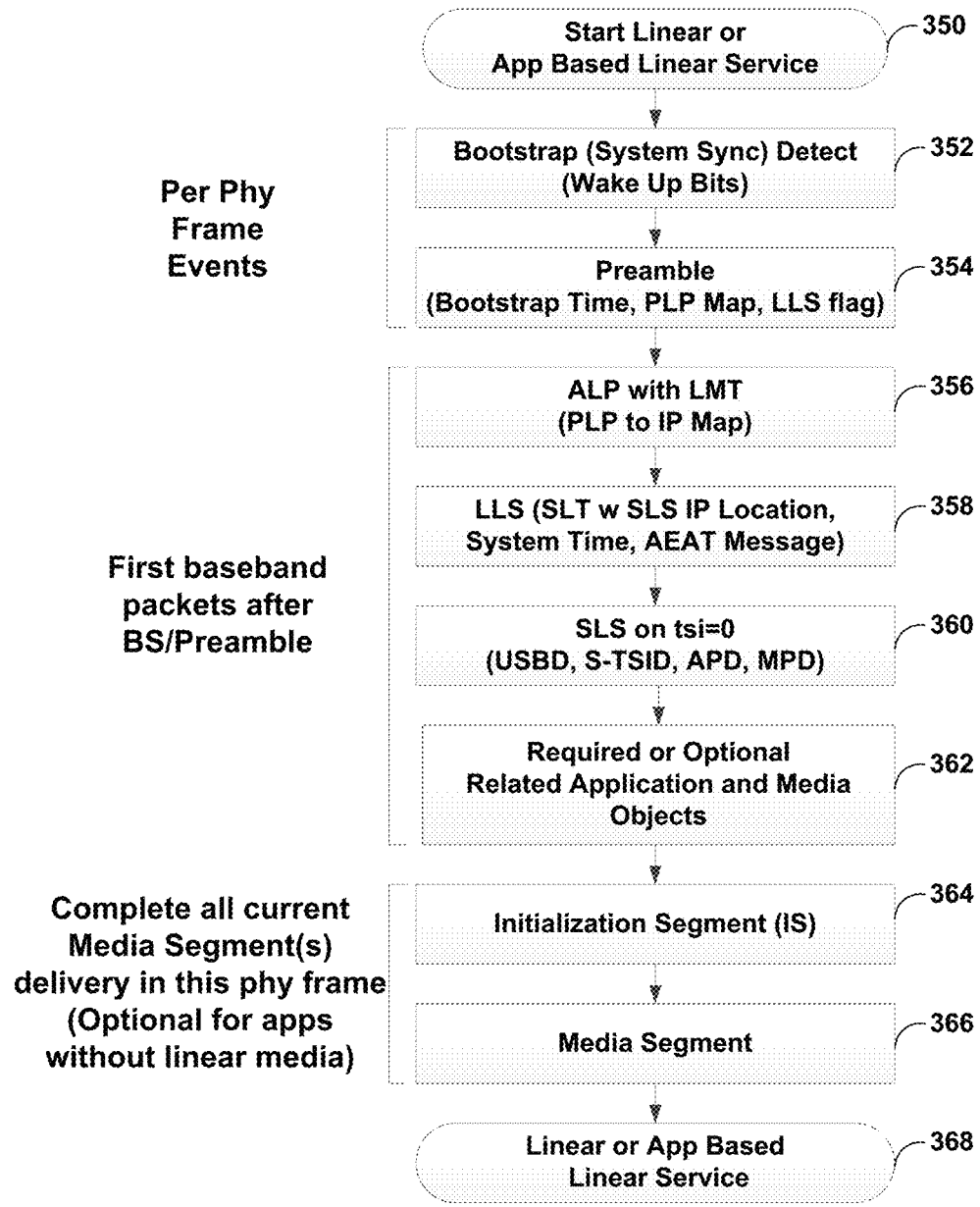
FIG. 13 is a flowchart illustrating an example sequence of acquisition events.

FIG. 13 depicts one example of a method including a sequence of steps corresponding to potential system events to enable service acquisition for multiple layers of media data. That is, FIG. 13 is a flowchart illustrating an example sequence of acquisition events. The method of FIG. 13 may be performed by various devices and systems shown herein, such as content preparation device 20 and source device 60 of FIG. 1, system 180 of FIG. 5, or system 300 of FIG. 9. For purposes of example and explanation, the method of FIG. 13 is explained with respect to system 180 of FIG. 5.

System 180 delivers sequence of data that enables the start of a linear or application based linear service (350). FIG. 13 depicts a typical sequence of events at a receiver and order of system (180) delivery of related metadata, other objects, and media files related to a typical start of service reception. This start of service is typically initiated (350) by channel number entry, channel up/down key entry, or guide selection of a service. The acquisition of physical layer is started by receipt of a bootstrap or system sync pattern (352). System metadata related to physical layer and acquisition of additional system metadata is accomplished via preamble or similar physical layer description metadata receipt (354). Upon identification of location of the desired PLPs or other physical layer packet streams in the waveform desired packet streams are received which contain ALP other similar encapsulation protocol containing an map (cross reference) of packet stream IDs (PLP IDs) to contained IP or other similar packet stream IDs or addresses (356). The preamble or similar (354) contains flag that identifies the presence of system metadata (LLS) which identifies service details such as system time, service composition (SLT), possible alerting information (AEAT) (358). The SLT made available in LLS (358) contains the location of per service details in the SLS (360). PLPs carrying the service may also contain an application which may include a run time application (362), which can allow television service to operate in a browser based interface. If present, the application may launch prior to service start or after. Once these steps, driven by related data reception, are complete, media playback can be initiated from receipt and decode of an IS (364) and related Media Segment (366). Then a linear or application based linear service may begin (368).

The end to end decode delay of MDE(s) is a static time earlier than Segment level decode. This static offset can be achieved via existing metadata in the MPD or a rewrite of the MPD that changes the value of metadata to enable MPD play of the MDEs. The value of the offset can be determined from first RAP play via MDE relative to time first RAP would play from Segment level.

Features related to scheduling of an MDE may include:
  Temporal organization of media types and metadata to minimize acquisition time.
    Providing smaller media data types with earlier latest times to assure complete delivery and as a simplification relative to trying to interleave with other media via many smaller scheduled objects. This method results in greater flexibility in scheduling i.e., a few larger objects with more time latitude rather than many smaller objects with tight requirements. Increased scheduling flexibility generally results in superior outcomes in terms of overall efficiency.

Should more robust performance be desired for audio and essential metadata these maybe scheduled together in a more robust physical layer pipe.

In a case which a specific interleaving of media types is desired in a common delivery pipe the use of multiplexed Segment may be simpler to implement. Samples inside the multiplexed media object provided in delivery/decode order.

Methods to preserve rapid acquisition by means of optional physical layer synchronization locations.

Recognition of T-RAP delivery ahead of nominal location i.e., trailing nominal physical layer sync or related nominal analysis interval.

Adaptation based on current scheduling cycle having met all delivery requests i.e., if all data requests with latest in the nominal frame physical layer period have been met.

Means to adapt to non-exact time duration of physical layer frame to media GoP aligned analysis interval utilizing rule that transmitter must start on a known whole second and msec. (Sync mode will always run on even seconds and milliseconds by definition.) Symbol mode will always maintain an integer number of symbols elapsed time starting from a second and millisecond of ATSC time. (Symbol rates may be changed among predefined values specified in or determined from configuration information.)

Assignment of frame sync to nearest available symbol location in time trailing nominal position relative to analysis interval.

Assignment of frame sync to nearest available location in a symbol leading nominal analysis interval position.

Any other rule based physical layer sync based scheme relative to a defined analysis interval.

Defined analysis interval linked to media GoP or similar structure.

Possible low latency method based on analysis intervals based on Segment durations rather than GoPs.

Primary rate management based on RAP Segments.

Adjustment of trailing non RAP Segments to compensate for failed PSNR or other quality metric.

This disclosure generally describes various techniques, which may be used alone or in any combination, to identify the locations of MDEs, media aware byte ranges, within file transport protocols, such as ROUTE or MMT. These techniques may be based on explicit description and matching of valid patterns or determination of valid patterns by rule(s). These techniques may be combined. There is no restriction on the order of combination. Likewise, this disclosure also describes time aspects as a background to discussion of techniques for organizing physical layer synchronization and other delivery aspects. These techniques may enable rapid acquisition in systems with variable or in-exact sync locations relative to an analysis interval related to media.

Figure 14:
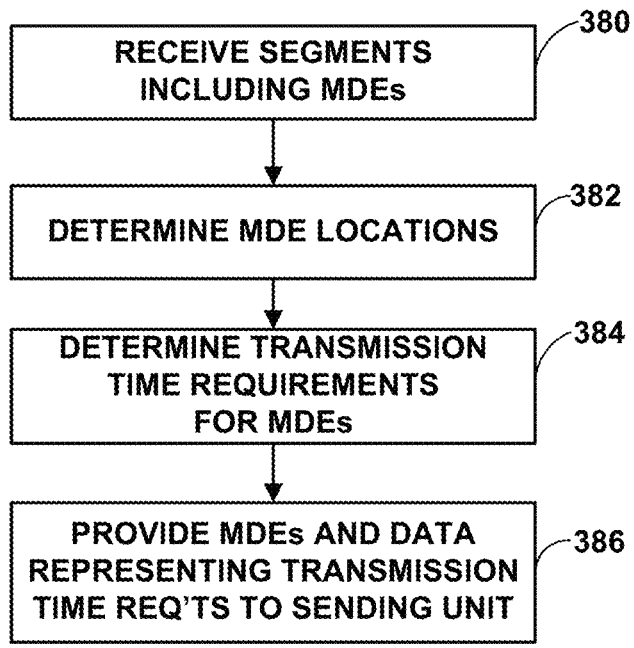
FIG. 14 is a flowchart illustrating another example method in accordance with the techniques of this disclosure.

FIG. 14 is a flowchart illustrating another example method in accordance with the techniques of this disclosure. The method of FIG. 14 is explained as being performed by a file-based protocol sending unit, such as sender 188 of FIG. 5 or sender 312 of FIG. 9. For purposes of explanation, the method of FIG. 14 is explained with respect to sender 312 of FIG. 9, but it should be understood that other units may be configured to perform this or a similar method. As discussed above, sender 312 represents an example of a file-based protocol sending unit, e.g., a unit that sends data according to ROUTE protocol or FLUTE protocol, or other file-based transmission protocols.

Initially in the example of FIG. 14, sender 312 receives one or more Segments including one or more MDEs (380). For example, the MDEs may correspond to deliverable byte ranges of the Segments. Sender 312 then determines MDE locations (382). In general, sender 312 does not receive explicit information signaling the locations of the MDEs, but instead uses one or more of the techniques of this disclosure to process data of the Segments to determine the locations of the MDEs. For example, sender 312 may perform pattern matching techniques or rules defining how MDEs can be identified, as discussed above. Sender 312, accordingly, may use the pattern matching techniques, rules, or other such techniques to identify MDEs within the Segments.

Sender 312 may further determine transmission time requirements for the MDEs (384). For example, sender 312 may analyze data of a manifest file corresponding to the Segments, and determine the transmission time requirements from the manifest file. The manifest file may comprise, for example, an MPD according to DASH. The transmission time requirements may represent one or both of an earliest transmission time or a latest transmission time for one or more of the MDEs, as discussed above.

Ultimately, sender 312 may provide the MDEs and data representing the transmission time requirements for the MDEs to a physical layer sending unit (386), such as scheduler 314 and exciter/amplifier 316. In this manner, scheduler 314 may schedule transmission of the MDEs according to the transmission time requirements, such that exciter/amplifier 316 transmits data of the MDEs no earlier than the earliest transmission time and/or no later than the latest transmission time.

In this manner, the method of FIG. 14 represents an example of a method including, by a file-based protocol sending unit of a source device, receiving a stream of data comprising Segments of media data from a segmenter of the source device that forms the Segments, each of the Segments comprising a respective individually retrievable file associated with a unique uniform resource locator (URL) or uniform resource identifier (URI), determining locations of media delivery events (MDEs) in the stream of media data, wherein the MDEs include data for at least a portion of one of the Segments, determining one or more transmission time requirements for the MDEs representing times at which the MDEs are to be sent to a client device, and providing the MDEs and data representing the transmission time requirements to a physical layer sending unit of the source device according to available delivery slots for the physical layer sending unit.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of transporting media data, the method comprising, by a file-based protocol sending unit of a source device:

receiving a stream of data comprising Segments of media data from a segmenter of the source device that forms the Segments, each of the Segments comprising a respective individually retrievable file associated with a unique uniform resource locator (URL) or uniform resource identifier (URI);

determining locations of media delivery events (MDEs) in the stream of media data, wherein the MDEs include data for at least a portion of one of the Segments;

determining one or more transmission time requirements for the MDEs representing times at which the MDEs are to be sent to a client device; and providing the MDEs and data representing the transmission time requirements to a physical layer sending unit of the source device according to available delivery slots for the physical layer sending unit.

2. The method of claim 1, wherein determining the locations of the MDEs comprises determining the locations of the MDEs using pattern matching.

3. The method of claim 2, wherein the media data comprises video data, and wherein determining the locations of the MDEs using pattern matching comprises:

obtaining data defining a cadence for video frames of the stream, wherein the defined cadence represents an order in which types for the video frames are sent, the types for the video frames including intra-predicted video frames and inter-predicted video frames; and determining at least some of the MDEs based on the defined cadence such that the MDEs are between respective video frame boundaries.

4. The method of claim 2, wherein the media data comprises audio data, and wherein determining the locations of the MDEs using pattern matching comprises:

determining a fixed number of audio frames of the stream to be included in each of the MDEs; and determining at least some of the MDEs to each include the fixed number of audio frames from the stream.

5. The method of claim 1, wherein determining the locations of the MDEs comprises determining the locations of the MDEs using rules, comprising:

receiving data representing one or more rules defining one or more of audio frames, video frames, and timed text instances;

determining locations of at least one audio frame, video frame, or timed text instance based on the rules; and determining the MDEs based on the locations of the at least one audio frame, video frame, or timed text instance.

6. The method of claim 1, wherein determining the locations of the MDEs comprises determining the locations of the MDEs based on timing information for physical layer synchronization of the physical layer sending unit.

7. The method of claim 1, wherein determining the locations of the MDEs comprises analyzing a hint track including metadata representative of locations of playable data within the stream.

8. The method of claim 1, wherein determining the transmission time requirements comprises determining an earliest transmission time for one of the MDEs based on a system configuration for the source device.

9. The method of claim 1, wherein determining the transmission time requirements comprises determining a latest transmission time for one of the MDEs based on a segment availability time for a Segment for which data is included in the one of the MDEs, the method further comprising determining segment availability time from a manifest file for the stream of data.

10. A source device for transporting media data, the source device comprising:
- a segmenter configured to form a stream of data comprising Segments of media data, each of the Segments comprising a respective individually retrievable file associated with a unique uniform resource locator (URL) or uniform resource identifier (URI);
- a physical layer sending unit implemented in circuitry and configured to deliver media delivery events (MDEs) to a client device according to transmission time requirements for the MDEs, wherein the MDEs include data for at least a portion of one of the Segments, wherein the physical layer sending unit is configured with available delivery slots for receiving data to be delivered; and
- a file-based protocol sending unit implemented in circuitry and configured to:
  - receive the stream of data comprising the Segments of media data from the Segmenter;
  - determine locations of the MDEs in the stream of media data;
  - determine one or more of the transmission time requirements for the MDEs representing times at which the MDEs are to be sent to the client device; and
  - provide the MDEs and data representing the transmission time requirements to the physical layer sending unit according to the available delivery slots for the physical layer sending unit.

11. The source device of claim 10, wherein the file-based protocol sending unit is configured to determine the locations of the MDEs using pattern matching.

12. The source device of claim 11, wherein the media data comprises video data, and wherein to determine the locations of the MDEs using pattern matching, the file-based protocol sending unit is configured to:
- obtain data defining a cadence for video frames of the stream, wherein the defined cadence represents an order in which types for the video frames are sent, the types for the video frames including intra-predicted video frames and inter-predicted video frames; and
- determine at least some of the MDEs based on the defined cadence such that the MDEs are between respective video frame boundaries.

13. The source device of claim 11, wherein the media data comprises audio data, and wherein to determine the locations of the MDEs using pattern matching, the file-based protocol sending unit is configured to:
- determine a fixed number of audio frames of the stream to be included in each of the MDEs; and
- determine at least some of the MDEs to each include the fixed number of audio frames from the stream.

14. The source device of claim 10, wherein the file-based protocol sending unit is configured to use rules to determine the locations of the MDEs, and wherein to use the rules, the file-based protocol sending unit is configured to:
- receive data representing one or more rules defining one or more of audio frames, video frames, and timed text instances;
- determine locations of at least one audio frame, video frame, or timed text instance based on the rules; and
- determine the MDEs based on the locations of the at least one audio frame, video frame, or timed text instance.

15. The source device of claim 10, wherein the file-based protocol sending unit is configured to determine the locations of the MDEs based on timing information for physical layer synchronization of the physical layer sending unit.

16. The source device of claim 10, wherein to determine the locations of the MDEs, the file-based protocol sending unit is configured to analyze a hint track including metadata representative of locations of playable data within the stream.

17. The source device of claim 10, wherein to determine the transmission time requirements, the file-based protocol sending unit is configured to determine an earliest transmission time for one of the MDEs based on a system configuration for the source device.

18. The source device of claim 10, wherein to determine the transmission time requirements, the file-based protocol sending unit is configured to determine a latest transmission time for one of the MDEs based on a segment availability time for a Segment for which data is included in the one of the MDEs, and wherein the file-based protocol sending unit is further configured to determine segment availability time from a manifest file for the stream of data.

19. A source device for transporting media data, the source device comprising:
- a segmenter configured to form a stream of data comprising Segments of media data, each of the Segments comprising a respective individually retrievable file associated with a unique uniform resource locator (URL) or uniform resource identifier (URI);
- a physical layer sending unit implemented in circuitry and configured to deliver media delivery events (MDEs) to a client device according to transmission time requirements for the MDEs, wherein the MDEs include data for at least a portion of one of the Segments, wherein the physical layer sending unit is configured with available delivery slots for receiving data to be delivered;
- means for receiving a stream of data comprising Segments of media data from the segmenter;
- means for determining locations of the MDEs in the stream of media data;
- means for determining one or more transmission time requirements for the MDEs representing times at which the MDEs are to be sent to the client device; and
- means for providing the MDEs and data representing the transmission time requirements to the physical layer sending unit according to available delivery slots for the physical layer sending unit.

20. The source device of claim 19, wherein the means for determining the locations of the MDEs comprises means for determining the locations of the MDEs using pattern matching.

21. The source device of claim 20, wherein the media data comprises video data, and wherein the means for determining the locations of the MDEs using pattern matching comprises:
- means for obtaining data defining a cadence for video frames of the stream, wherein the defined cadence represents an order in which types for the video frames are sent, the types for the video frames including intra-predicted video frames and inter-predicted video frames; and
- means for determining at least some of the MDEs based on the defined cadence such that the MDEs are between respective video frame boundaries.

22. The source device of claim 20, wherein the media data comprises audio data, and wherein the means for determining the locations of the MDEs using pattern matching comprises:
- means for determining a fixed number of audio frames of the stream to be included in each of the MDEs; and means for determining at least some of the MDEs to each include the fixed number of audio frames from the stream.

23. The source device of claim 19, wherein the means for determining the locations of the MDEs comprises means for determining the locations of the MDEs using rules, comprising:
means for receiving data representing one or more rules defining one or more of audio frames, video frames, and timed text instances;
means for determining locations of at least one audio frame, video frame, or timed text instance based on the rules; and
means for determining the MDEs based on the locations of the at least one audio frame, video frame, or timed text instance.

24. The source device of claim 19, wherein the means for determining the locations of the MDEs comprises means for determining the locations of the MDEs based on timing information for physical layer synchronization of the physical layer sending unit.

25. The source device of claim 19, wherein the means for determining the locations of the MDEs comprises means for analyzing a hint track including metadata representative of locations of playable data within the stream.

26. The source device of claim 19, wherein the means for determining the transmission time requirements comprises means for determining an earliest transmission time for one of the MDEs based on a system configuration for the source device.

27. The source device of claim 19, wherein the means for determining the transmission time requirements comprises means for determining a latest transmission time for one of the MDEs based on a segment availability time for a Segment for which data is included in the one of the MDEs, the method further comprising determining segment availability time from a manifest file for the stream of data.

28. A non-transitory computer-readable storage medium having stored thereon instructions that, when executed, cause a file-based protocol sending unit of a source device to:
receive a stream of data comprising Segments of media data from a segmenter of the source device that forms the Segments, each of the Segments comprising a respective individually retrievable file associated with a unique uniform resource locator (URL) or uniform resource identifier (URI);
determine locations of media delivery events (MDEs) in the stream of media data, wherein the MDEs include data for at least a portion of one of the Segments;
determine one or more transmission time requirements for the MDEs representing times at which the MDEs are to be sent to a client device; and
provide the MDEs and data representing the transmission time requirements to a physical layer sending unit of the source device according to available delivery slots for the physical layer sending unit.

29. The non-transitory computer-readable storage medium of claim 28, wherein the instructions that cause the processor to determine the locations of the MDEs comprise instructions that cause the processor to determine the locations of the MDEs using pattern matching.

30. The non-transitory computer-readable storage medium of claim 29, wherein the media data comprises video data, and wherein the instructions that cause the processor to determine the locations of the MDEs using pattern matching comprise instructions that cause the processor to:
obtain data defining a cadence for video frames of the stream, wherein the defined cadence represents an order in which types for the video frames are sent, the types for the video frames including intra-predicted video frames and inter-predicted video frames; and
determine at least some of the MDEs based on the defined cadence such that the MDEs are between respective video frame boundaries.

31. The non-transitory computer-readable storage medium of claim 29, wherein the media data comprises audio data, and wherein the instructions that cause the processor to determine the locations of the MDEs using pattern matching comprise instructions that cause the processor to:
determine a fixed number of audio frames of the stream to be included in each of the MDEs; and
determine at least some of the MDEs to each include the fixed number of audio frames from the stream.

32. The non-transitory computer-readable storage medium of claim 28, wherein the instructions that cause the processor to determine the locations of the MDEs comprise instructions that cause the processor to determine the locations of the MDEs using rules, comprising instructions that cause the processor to:
receive data representing one or more rules defining one or more of audio frames, video frames, and timed text instances;
determine locations of at least one audio frame, video frame, or timed text instance based on the rules; and
determine the MDEs based on the locations of the at least one audio frame, video frame, or timed text instance.

33. The non-transitory computer-readable storage medium of claim 28, wherein the instructions that cause the processor to determine the locations of the MDEs comprise instructions that cause the processor to determine the locations of the MDEs based on timing information for physical layer synchronization of the physical layer sending unit.

34. The non-transitory computer-readable storage medium of claim 28, wherein the instructions that cause the processor to determine the locations of the MDEs comprise instructions that cause the processor to analyze a hint track including metadata representative of locations of playable data within the stream.

35. The non-transitory computer-readable storage medium of claim 28, wherein the instructions that cause the processor to determine the transmission time requirements comprise instructions that cause the processor to determine an earliest transmission time for one of the MDEs based on a system configuration for the source device.

36. The non-transitory computer-readable storage medium of claim 28, wherein the instructions that cause the processor to determine the transmission time requirements comprise instructions that cause the processor to determine a latest transmission time for one of the MDEs based on a segment availability time for a Segment for which data is included in the one of the MDEs, the method further comprising determining segment availability time from a manifest file for the stream of data.

* * * * *